(12) United States Patent
Fang et al.

(10) Patent No.: US 12,589,791 B2
(45) Date of Patent: Mar. 31, 2026

(54) HANDRAIL MECHANISM AND BABY CARRIAGE INCLUDING THE SAME

(71) Applicant: Wonderland Switzerland AG, Steinhausen (CH)

(72) Inventors: Liwu Fang, Steinhausen (CH); Wanquan Zhu, Steinhausen (CH); Zhengwen Guo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 195 days.

(21) Appl. No.: 18/264,829

(22) PCT Filed: Feb. 10, 2022

(86) PCT No.: PCT/EP2022/053266
§ 371 (c)(1),
(2) Date: Aug. 9, 2023

(87) PCT Pub. No.: WO2022/171747
PCT Pub. Date: Aug. 18, 2022

(65) Prior Publication Data
US 2024/0109577 A1 Apr. 4, 2024

(30) Foreign Application Priority Data

Feb. 10, 2021 (CN) .......................... 202110188163.7

(51) Int. Cl.
*B62B 9/24* (2006.01)
*B62B 9/10* (2006.01)

(52) U.S. Cl.
CPC ................ *B62B 9/24* (2013.01); *B62B 9/102* (2013.01)

(58) Field of Classification Search
CPC .. B62B 9/24; B62B 9/102; B62B 7/14; B62B 7/062
See application file for complete search history.

(56) References Cited

U.S. PATENT DOCUMENTS

| | | | |
|---|---|---|---|
| 10,299,609 B2 * | 5/2019 | Taylor .................. | B60N 2/2821 |
| 10,300,814 B2 * | 5/2019 | Williams ............. | B60N 2/2824 |

(Continued)

FOREIGN PATENT DOCUMENTS

| | | | |
|---|---|---|---|
| CN | 201685860 U | | 12/2010 |
| CN | 201849521 U | * | 6/2011 |

(Continued)

OTHER PUBLICATIONS

"Notice of Reasons for Refusal Issued in Corresponding Japanese Patent Application No. 2023-547104", Mailed Date: Aug. 27, 2024, 10 pages.

(Continued)

*Primary Examiner* — James A Shriver, II
*Assistant Examiner* — Ian Bryce Shelton
(74) *Attorney, Agent, or Firm* — Volpe Koenig

(57) ABSTRACT

According to the application, a handrail mechanism for a baby carriage includes: a shell having an accommodating space; a handrail connecting part having a free end and a pivotal end, the pivotal end being pivotally connected to the shell; and an elastic member arranged in the accommodating space of the shell, the elastic member having one end connected to the shell, and the other end connected to the handrail connecting part. Among them, the handrail connecting part is able to be pivoted between a bounced up position and a pressed down position, the free end of the handrail connecting part is away from the shell in the bounced up position and is close the shell in the pressed down position, the elastic member is arranged to bias the handrail connecting part toward the bounced up position, and when an external force is applied to overcome an action of the elastic member, the handrail connecting part is able to be pivoted from the bounced up position to the pressed down (Continued)

position. A baby carriage including the handrail mechanism is also disclosed.

19 Claims, 14 Drawing Sheets

(56) References Cited

U.S. PATENT DOCUMENTS

| | | | | |
|---|---|---|---|---|
| 10,524,585 B2 * | 1/2020 | Taylor | ................. | B60N 2/2821 |
| 2012/0104808 A1 * | 5/2012 | Sellers | ................. | B60N 2/2845 |
| | | | | 297/183.4 |
| 2019/0320812 A1 * | 10/2019 | Zhong | ..................... | B62B 9/102 |
| 2019/0320814 A1 * | 10/2019 | Zhong | ..................... | A47D 1/02 |

FOREIGN PATENT DOCUMENTS

| CN | 201941820 U | | 8/2011 | | |
|---|---|---|---|---|---|
| CN | 204548204 U | | 8/2015 | | |
| CN | 104986213 A | | 10/2015 | | |
| CN | 205952042 U | | 2/2017 | | |
| CN | 107082083 A | * | 8/2017 | ............. | B62B 9/104 |
| CN | 206501880 U | | 9/2017 | | |
| CN | 206968751 U | * | 2/2018 | | |
| CN | 108001513 A | * | 5/2018 | ............. | B62B 9/104 |
| CN | 108297926 A | * | 7/2018 | ............. | B62B 7/083 |
| CN | 108909813 A | * | 11/2018 | ............... | B62B 7/06 |
| CN | 109178078 A | * | 1/2019 | ............. | B62B 9/102 |
| CN | 110155148 A | * | 8/2019 | ............... | B62B 7/06 |
| CN | 110654443 A | * | 1/2020 | ............... | B62B 7/06 |
| CN | 110775137 A | * | 2/2020 | ............... | B62B 9/20 |
| CN | 210027571 U | | 2/2020 | | |
| CN | 112026902 A | * | 12/2020 | ............. | B62B 9/102 |
| CN | 112061218 A | * | 12/2020 | ............... | B62B 7/06 |
| CN | 112550419 A | | 3/2021 | | |
| CN | 212950784 U | | 4/2021 | | |
| DE | 102019110323 A1 | | 10/2019 | | |
| JP | S46029699 Y | | 10/1971 | | |
| JP | S56161857 U | | 12/1981 | | |
| JP | 2020-146472 A | | 9/2020 | | |
| WO | WO-2020051872 A1 | * | 3/2020 | ............... | B62B 9/12 |

OTHER PUBLICATIONS

International Search Report and Written Opinion for Application No. PCT/EP2022/053266 dated May 19, 2022.
Taiwanese Office Action for Application No. 111104205 dated Oct. 11, 2022.

* cited by examiner

230

220

210

HANDRAIL MECHANISM AND BABY CARRIAGE INCLUDING THE SAME

CROSS-REFERENCE TO RELATED APPLICATIONS

This application is a 371 National Stage of International Patent Application No. PCT/EP2022/053266, filed on Feb. 10, 2022, which claims the benefit of Chinese Patent Application No. 202110188163.7, filed Feb. 10, 2021, the entire content of which are incorporated herein by reference.

TECHNICAL FIELD

The present application relates to a handrail mechanism and a baby carriage including the handrail mechanism.

BACKGROUND

The baby carriage is a carrier widely used in life. A baby carriage usually include a carriage frame, wheels, a seat, and a handrail. Among them, the carriage frame forms a main frame of the baby carriage, the wheels are installed under the carriage frame to provide travelling function, the seat is set up on the carriage frame for a baby to sit in, and the handrail is located in in front of the seat for supporting the baby and providing a certain protection function.

In the related art, handrails are generally divided into rigid handrails, i.e., fixed handrails made of rigid materials such as plastic, and soft handrails, i.e., handrails formed by suspending flexible materials such as cloth in front of a seat. In some environments, it is desirable to provide a new type of handrails between the rigid handrails and the soft handrails. The handrail can be made of rigid material, but at the same time has a certain degree of mobility, so as to provide a more comfortable environment for a child sitting in the seat, and facilitate the child to enter and leave the baby carriage.

SUMMARY

According to the application, a handrail mechanism for a baby carriage includes: a shell having an accommodating space; a handrail connecting part having a free end and a pivotal end, the pivotal end being pivotally connected to the shell; and an elastic member arranged in the accommodating space of the shell, the elastic member having one end connected to the shell, and the other end connected to the handrail connecting part. Among them, the handrail connecting part is able to be pivoted between a bounced up position and a pressed down position, the free end of the handrail connecting part is away from the shell in the bounced up position and is close the shell in the pressed down position, the elastic member is arranged to bias the handrail connecting part toward the bounced up position, and when an external force is applied to overcome an action of the elastic member, the handrail connecting part is able to be pivoted from the bounced up position to the pressed down position.

According to the application, a baby carriage includes: a carriage frame; wells, located under the carriage frame to provide a travelling direction; a seat frame, disposed on the carriage frame and including: two side frames, respectively located on both sides of the carriage frame, and extending along the travelling direction of the baby carriage; a handrail, set up on the two side frames, the handrail including a horizontal section extending between the two side frames and two vertical sections respectively connected to the two side frames from both ends of the horizontal section; and two handrail mechanisms according to any of claims 1-9, respectively installed at connections between the two vertical sections of the handrail and the two side frames, wherein the handrail connecting part is fixed to the vertical sections of the handrail, and the shell is fixed to the side frames.

BRIEF DESCRIPTION OF THE DRAWINGS

Embodiments of the application will be described in detail below in conjunction with the accompanying drawings, in which.

DETAILED DESCRIPTION

The disclosure is illustrated and described herein with reference to specific embodiments, though, the disclosure should not be limited to the details shown. Rather, various modifications can be made to these details within the scope of the equivalents of the claims and without departing from the disclosure.

The descriptions of "front," "rear," "up," "down" and other directions mentioned in this specification are only for the convenience of understanding, and the disclosure is not limited to these directions, but can be adjusted according to actual conditions.

Figure 1:
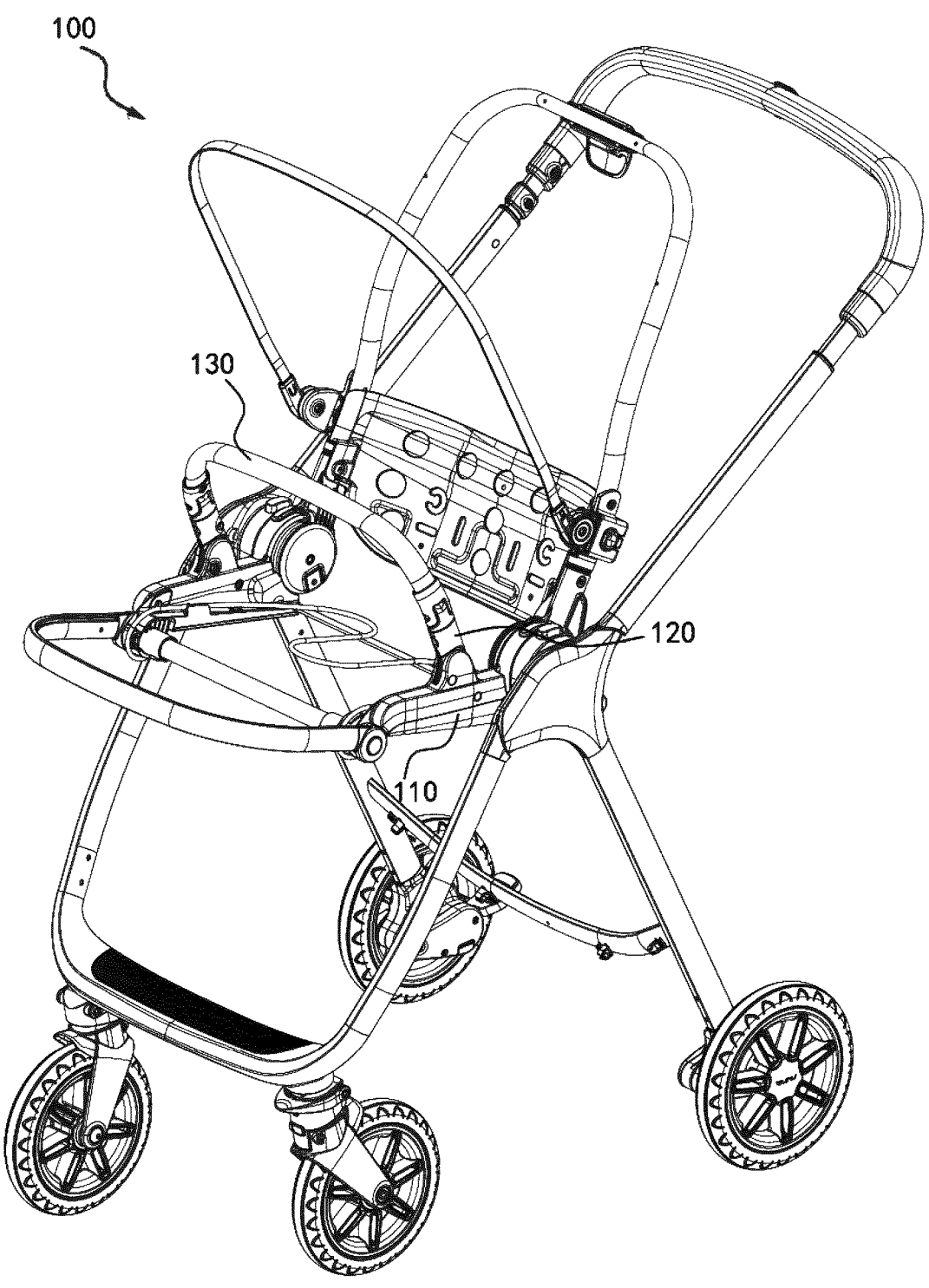
FIG. 1 shows a structural frame of a baby carriage according to a first embodiment of the application.
Figure 2:
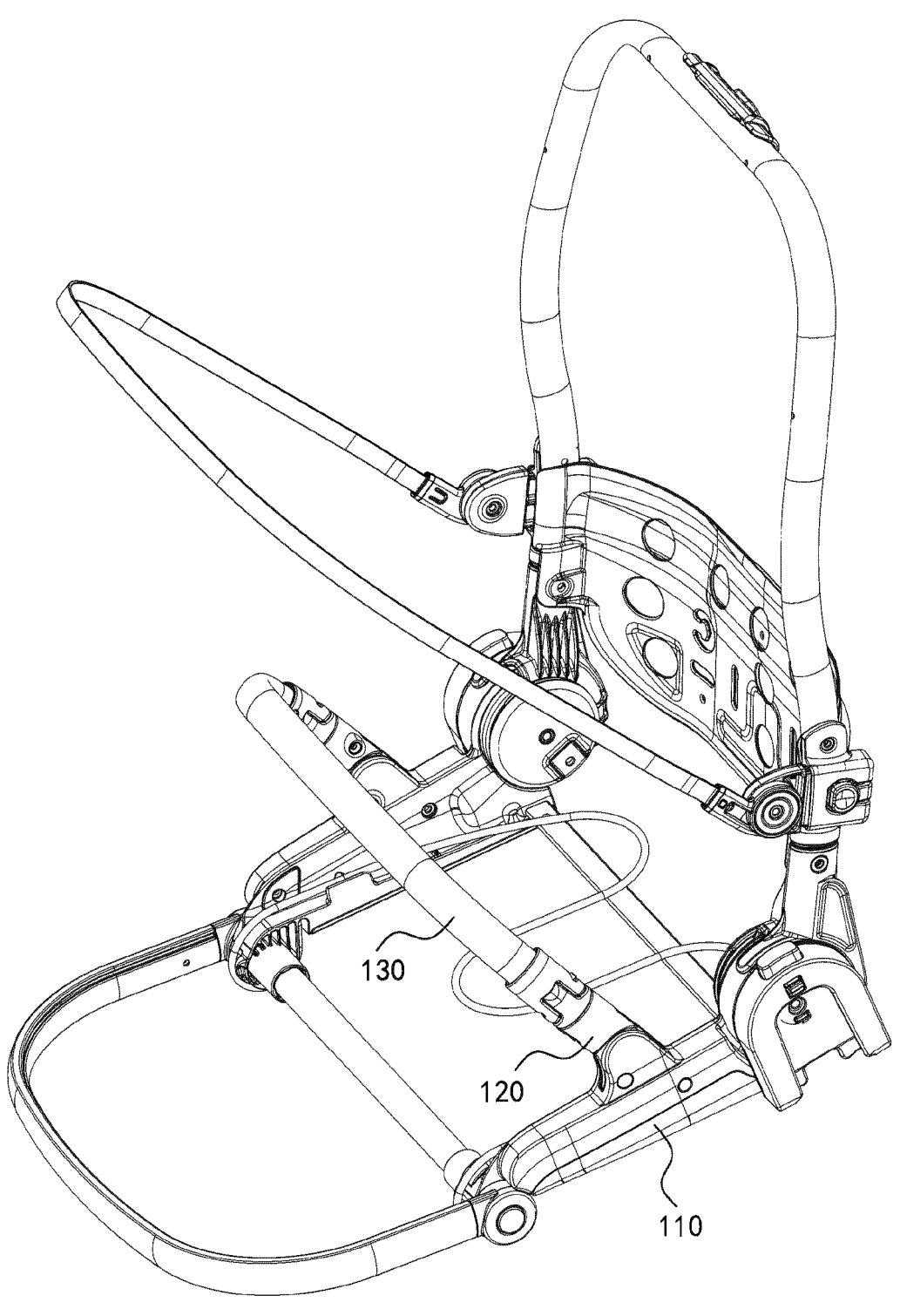
FIG. 2 shows a structural frame of the baby carriage according to the first embodiment of the application, in which the carriage frame and wheels are removed in order to clearly show the seat frame and handrails.

A first embodiment of the application will be described with reference to FIGS. 1-5. FIG. 1 shows a structural frame of a baby carriage 100 according to the first embodiment of the application; and FIG. 2 shows a structural frame of the baby carriage 100 according to the first embodiment of the application, in which the carriage frame and wheels are removed in order to clearly show the seat frame and handrails 130. The baby carriage 100 includes a carriage frame and wheels under the carriage frame. A seat frame is set up on the carriage frame for installing a seat. The seat is not shown in order to show the structure of the seat frame more clearly. The handrail 130 is located in front of a middle of the seat frame, and forms an enclosing form together with the seat frame. The handrail 130 can be used to support the child sitting in the seat, and can also protect the child from leaving the baby carriage 100 accidentally. The handrail 130 may include a horizontal section and vertical sections connected at both ends of the horizontal section. Among them, the horizontal section provides a supporting function of the handrail 130, and the vertical sections obliquely extend downward and backward to be connected to the carriage frame. In this embodiment, the vertical sections of the handrail 130 are connected to both sides of the seat frame by handrail mechanisms. The handrail mechanisms on both sides may be symmetrical, and accordingly, only one of the handrail mechanisms will be described below.

In the present application, the handrail mechanism each includes a shell 110, a handrail connecting part, and an elastic member 140.

Figure 3:
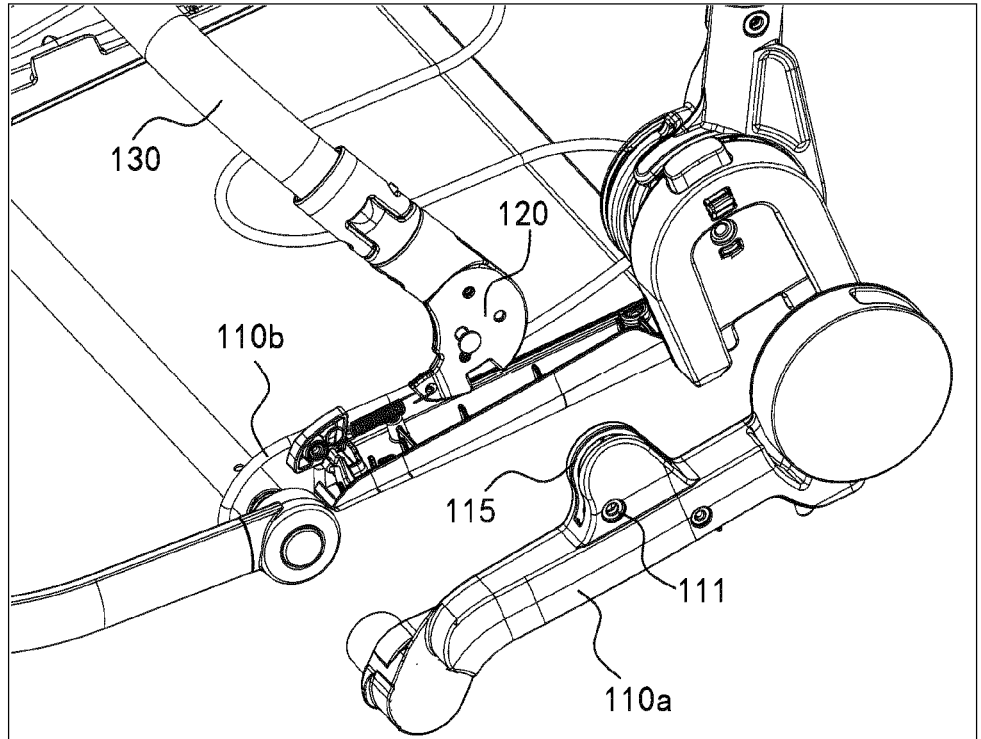
FIG. 3 is a partial enlarged view of a pivotal joint between the handrail and the seat frame of the baby carriage in FIG. 1, in which a detachable outer shell is shown in an exploded manner.

Referring to FIG. 3. FIG. 3 is a partial enlarged view of a pivotal joint between the handrail 130 and the seat frame of the baby carriage 100 in FIG. 1, in which a detachable outer shell 110a on a side of the seat is shown in an exploded manner. The shell 110 includes an inner shell 110b and an outer shell 110a. Among them, the inner shell 110b is closer to an inner side of the carriage frame and is coupled to the carriage frame or as a part of the carriage frame, and the outer shell 110a is clasped onto the inner shell 110b, so as to form the complete shell 110 having an internal accommodating space. A handrail mounting part 115 is disposed on a side of the outer shell 110a facing the handrail connecting part 120. The handrail mounting part 115 includes two opposite plate-shaped arms, and the two plate-shaped arms are substantially parallel to a bottom wall of the outer shell 110a.

The handrail connecting part 120 is generally rod-shaped and has a free end and a pivotal end opposite to each other. The free end is connected to one of the vertical sections of the handrail 130, and the pivotal end is connected to the shell 110. The pivotal end of the handrail connecting part 120 is in a shape of a flat plate, and is inserted between the two plate-shaped arms of the handrail mounting part 115. Opposite shell pivot holes 111 are arranged in the two arms of the handrail mounting part 115, accordingly, a handrail pivot hole (not shown) is arranged at the pivotal end of the handrail connecting part 120 to penetrate the pivotal end, and a handrail pivot 121 (FIG. 4) passes through the shell pivot holes 111 and the handrail pivot hole, so as to form a pivotal connection between the handrail connecting part 120 and the shell 110.

In this embodiment, both the inner shell 110b and the outer shell 110a are strip-shaped components extending along a front and rear direction of the baby carriage 100. In an embodiment, the inner shell 110b has only a bottom wall but no side wall, and the outer shell 110a has a bottom wall and a side wall surrounding the bottom wall. In other embodiments, the inner shell 110b and the outer shell 110a may have other shapes, as long as the shapes of the two shells are corresponding to each other so as to form an accommodating space. In other embodiments, the inner shell 110b may have a side wall while the outer shell 110a has no side wall, or the inner shell 110b and the outer shell 110a may both have side walls.

Figure 4:
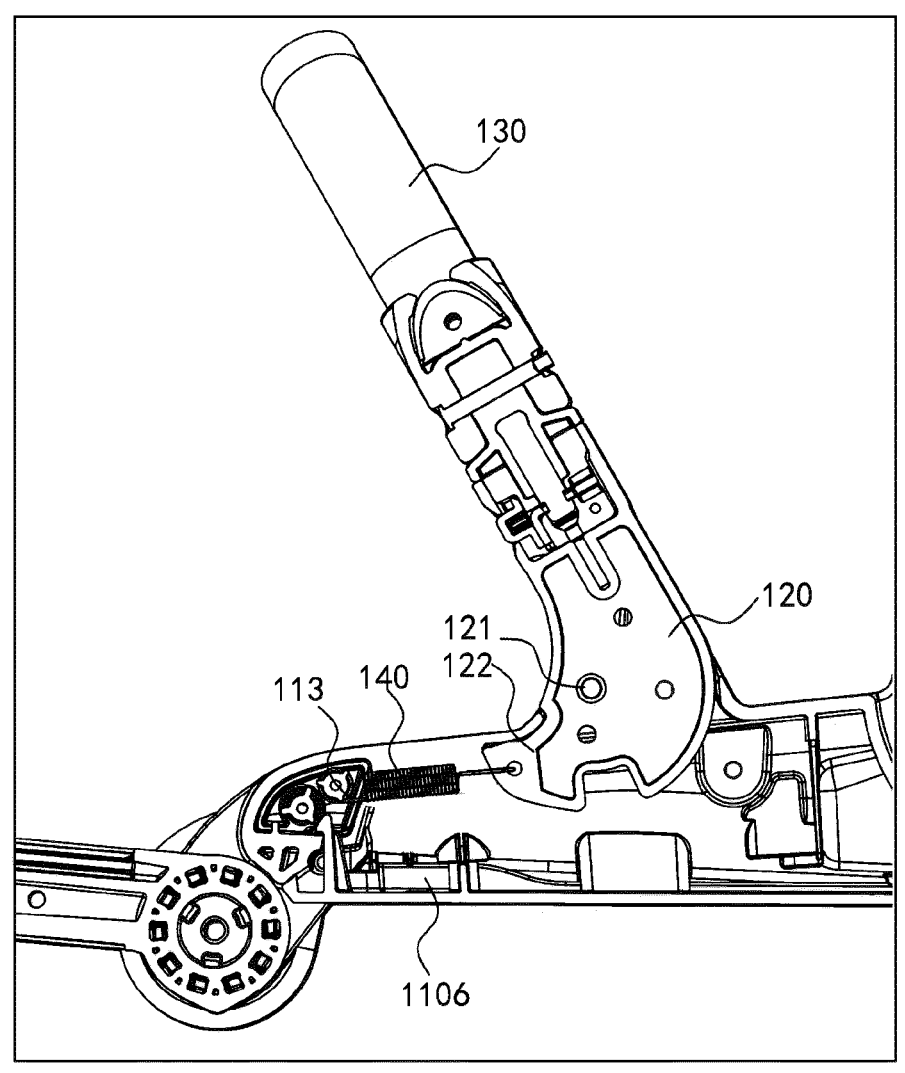
FIG. 4 is a partial enlarged section view of the pivotal joint between the handrail and the seat frame of the baby carriage in FIG. 1, in which the handrail is in a bounced up position.

Referring to both FIGS. 3 and 4. In this embodiment, the handrail mechanism includes the elastic member 140. The elastic member 140 is a tension spring, has one end fixedly connected to an elastic member fixing part 113 inside the shell 110, and the other end fixedly connected to an elastic member hole 122 of the handrail connecting part 120. In this embodiment, the elastic member fixing part 113 is a post rising from the bottom wall of the inner shell 110b toward the outer shell 110a, and the elastic member hole 122 is located at the pivotal end of the handrail connecting part 120, and is closer to the elastic member fixing part 113 than the handrail pivot 121. More specifically, when considered from a horizontal direction of the baby carriage 100, the elastic member hole 122 is located between the elastic member fixing part 113 and the handrail pivot 121, and when considered from a vertical direction of the baby carriage 100, the elastic member hole 122 is farther away from the free end of the handrail connecting part 120 than the handrail pivot 121.

In this embodiment, the elastic member fixing part 113 in the shell 110 is located at a front end of the shell 110. In other embodiments, the elastic member fixing part 113 may also be located at a rear end of the shell 110, and accordingly the elastic member 140 may be configured as a compression spring. In various embodiments, the elastic member 140 is always loaded to bias the handrail connecting part 120 toward a bounced up position.

Figure 5:
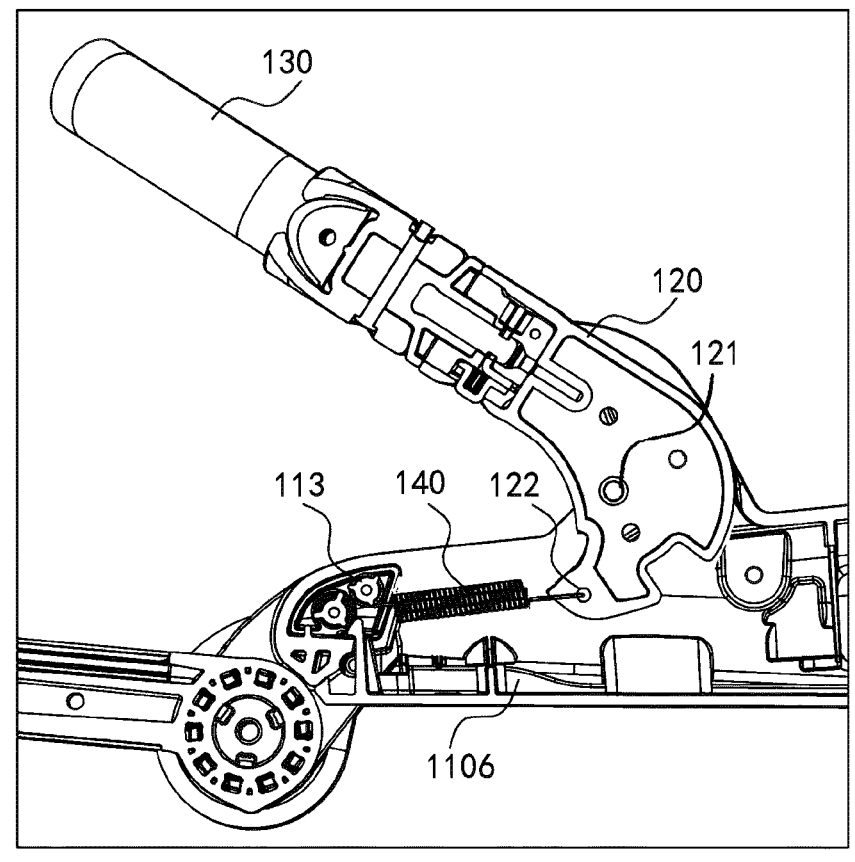
FIG. 5 is a partial enlarged section view of the pivotal joint between the handrail and the seat frame of the baby carriage in FIG. 1, in which the handrail is in a pressed down position.

Referring to FIGS. 4-5, an operation mode of the handrail 130 mechanism of the application will be described. FIG. 4 is a partial enlarged section view of the pivotal joint between the handrail 130 and the seat frame of the baby carriage 100 in FIG. 1, where the handrail 130 is in a bounced up position. FIG. 5 is a partial enlarged section view of the pivotal joint between the handrail 130 and the seat frame of the baby carriage 100 in FIG. 1, where the handrail 130 is in a pressed down position. As shown, when the handrail 130 is in the bounced up position, the free end of the handrail connecting part 120 is farther away from the shell 110, and the elastic member hole 122 in the handrail connecting part 120 is closer to the elastic member fixing part 113 in the shell 110. If the handrail 130 is not pressed down by an external force, the elastic member 140 tends to maintain the handrail connecting part 120 in the bounced up position, and there is a limiting component (not shown) between the handrail connecting part 120 and the shell 110 to prevent the handrail connecting part 120 from rotating beyond the bounced up position. When the handrail 130 is pressed down by an external force, the handrail connecting part 120 overcomes the bias of the elastic member 140 and rotates to the pressed down position. At this time, the free end of the handrail connecting part 120 is closer to the shell 110, and the elastic member hole 122 is farther away from the elastic member fixing part 113, so that the elastic member 140 is stretched. It is easy to understand, when the external force disappears, the handrail connecting part 120 (and the handrail 130) will return to the bounced up position under the bias of the elastic member 140, thereby realizing the automatic reset function of the handrail 130.

Figure 6:
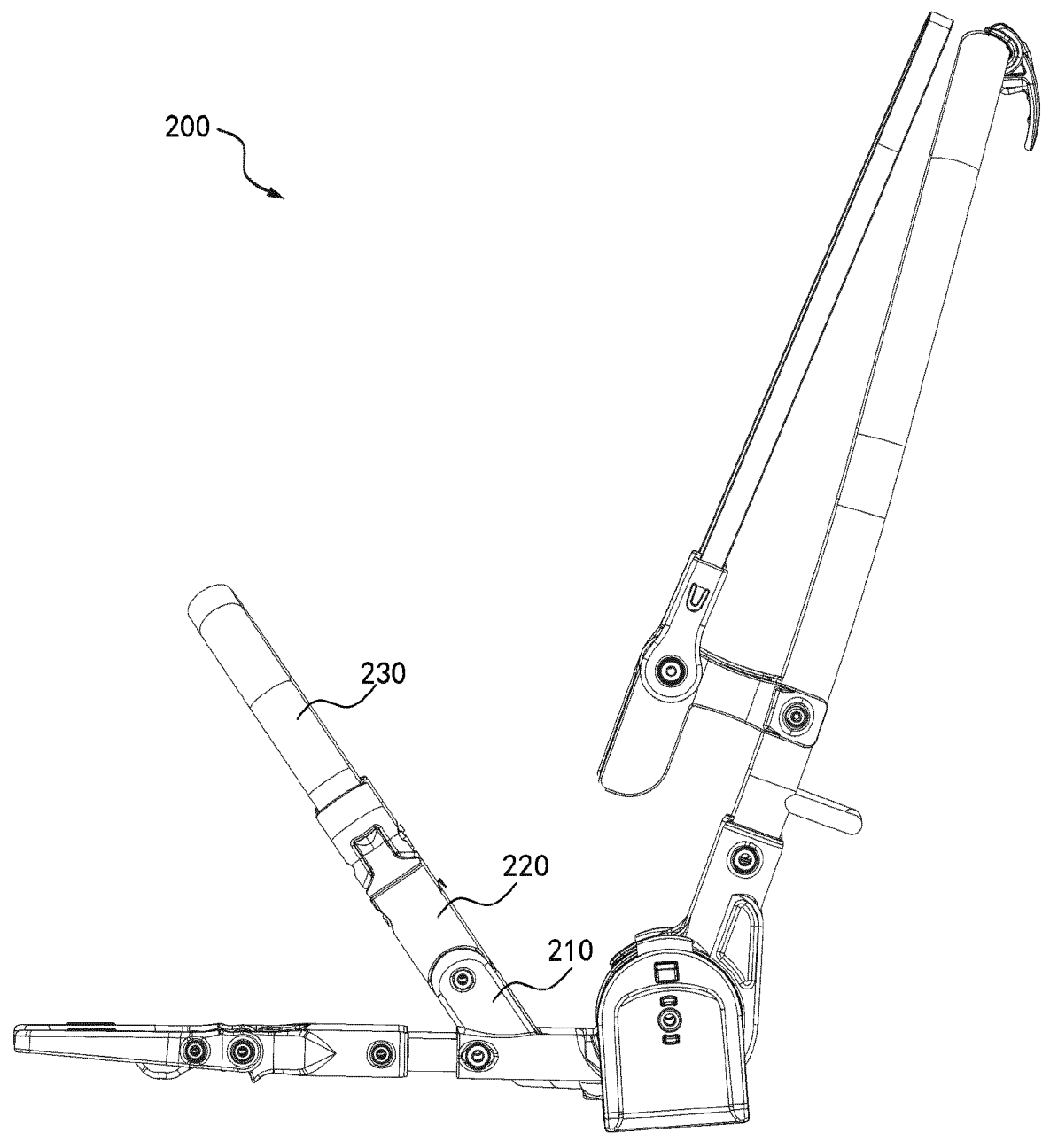
FIG. 6 is a side view of the baby carriage according to a second embodiment of the application, in which the handrail is in the bounced up position.
Figure 7:
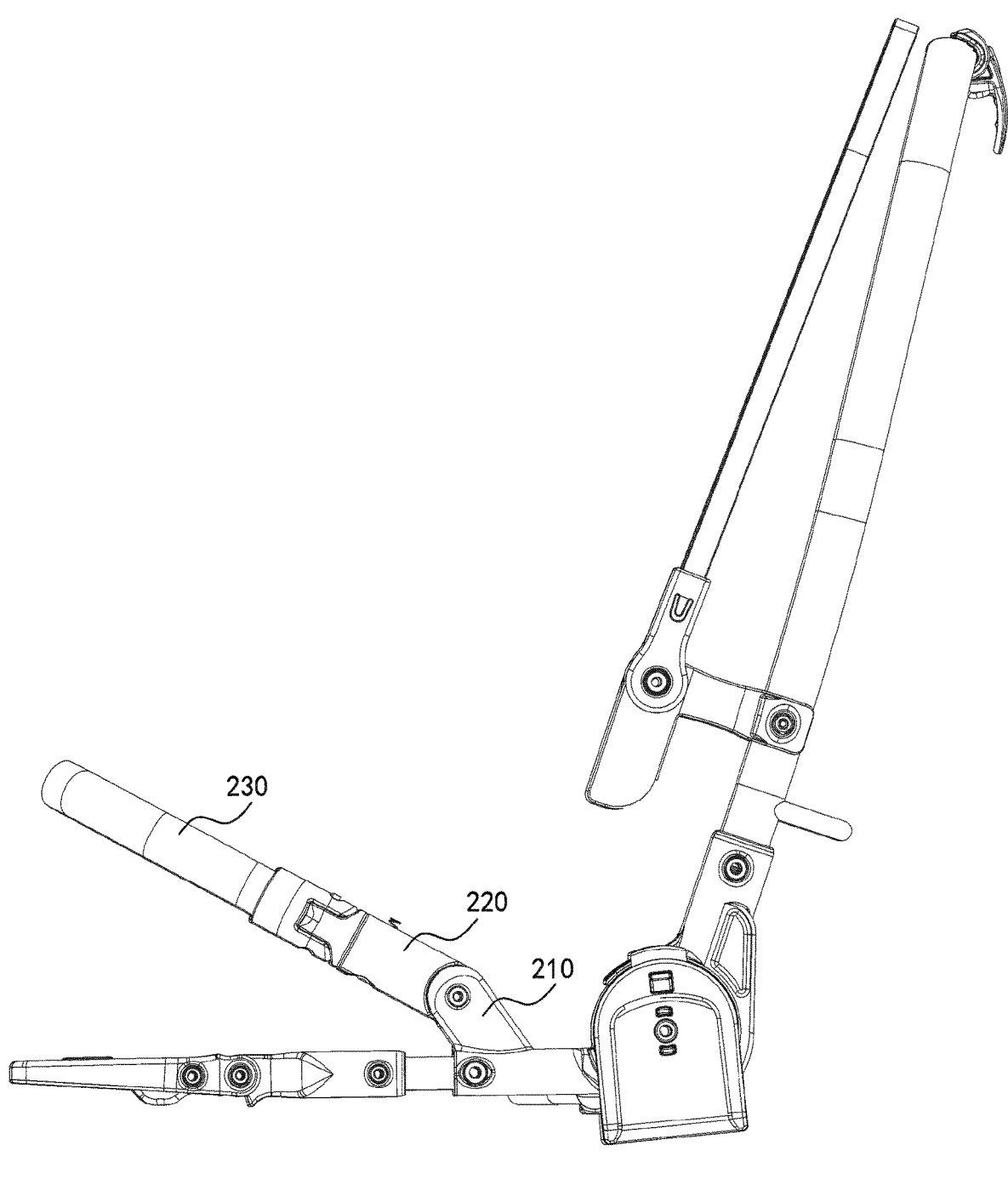
FIG. 7 is a side view of the baby carriage according to the second embodiment of the application, in which the handrail is in the pressed down position.
Figure 8:
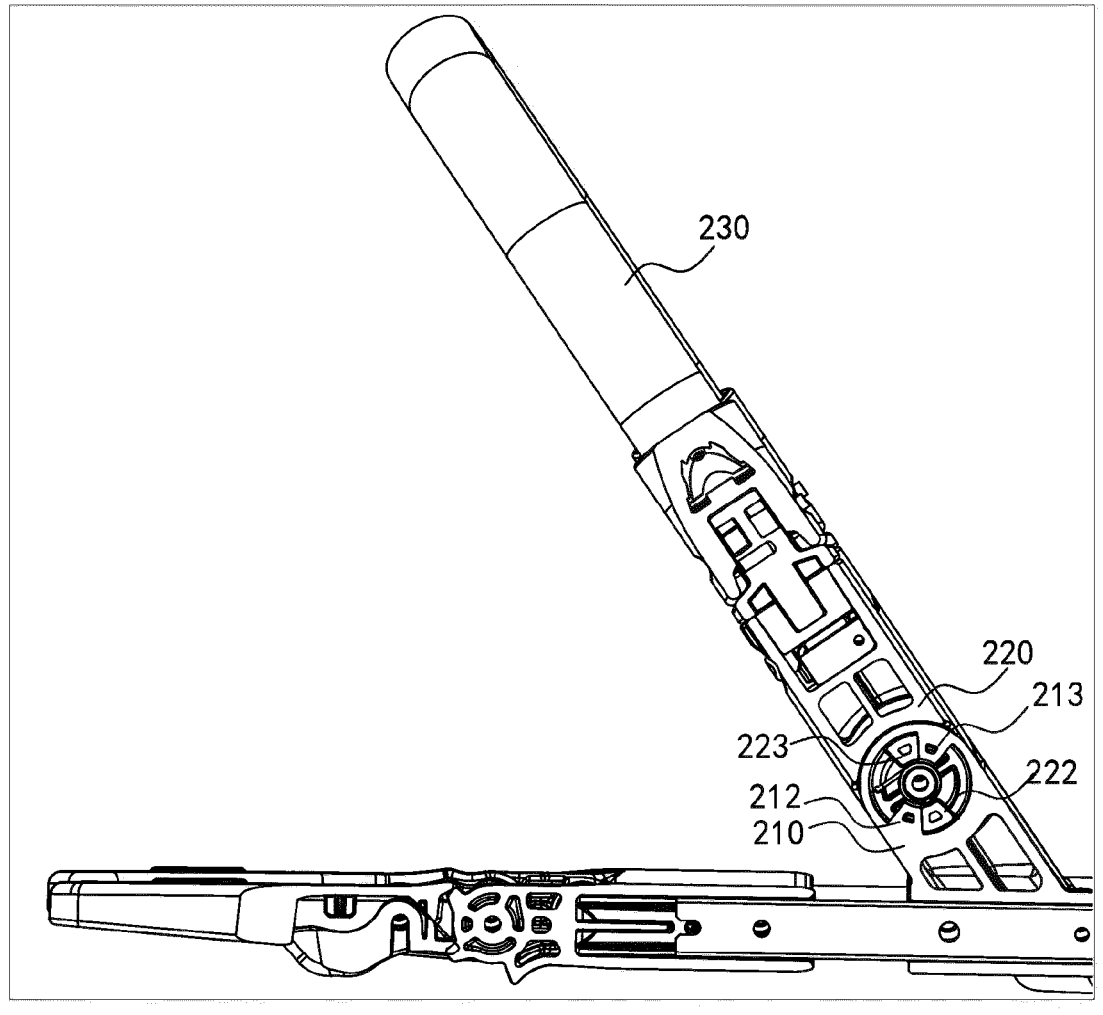
FIG. 8 is a partial enlarged section view of the pivotal joint between the handrail and the seat frame of the baby carriage in FIG. 6.

Referring to FIGS. 6-10, the second embodiment of the application will be described. FIG. 6 is a side view of the baby carriage 200 according to the second embodiment of the application, in which the handrail 230 is in the bounced up position; FIG. 7 is a side view of the baby carriage 200 according to the second embodiment of the application, in which the handrail 230 is in the pressed down position; FIG. 8 is a partial enlarged section view of the pivotal joint between the handrail 230 and the shell 210 of the baby carriage 200 in FIG. 6. What differs the second embodiment from the first embodiment is that the handrail connecting part 220 and the shell 210 are no longer inserted into each other through the flat pivot end and the flat handrail mounting part 215, but clasped to each other through a handrail box 225 and a shell box 215, which will be described in detail below.

Figure 9:
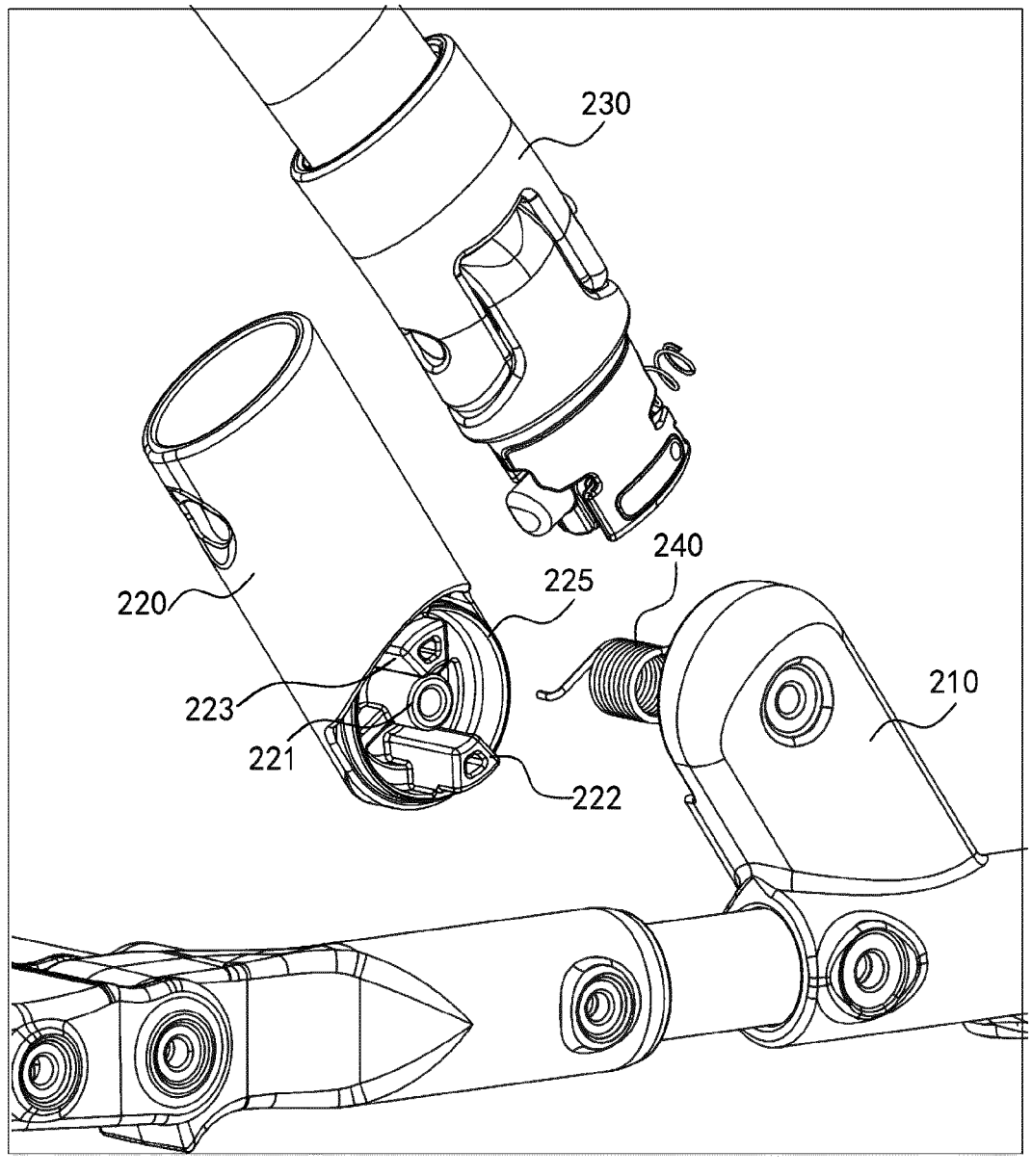
FIG. 9 is a partial enlarged view of the pivotal joint between the handrail and the seat frame of the baby carriage in FIG. 6, in which the shell, the handrail, the handrail connecting part, and the elastic member are shown in an exploded manner.

Referring to FIG. 9. FIG. 9 is a partial enlarged view of the pivotal joint between the handrail 230 and the shell 210 of the baby carriage 200 in FIG. 6, in which the shell 210, the handrail 230, the handrail connecting part 220, and the elastic member 240 are shown in an exploded manner. As shown, the free end of the handrail connecting part 220 is provided with the substantially cylindrical handrail box 225, and the handrail box 225 has a bottom wall and an annular side wall surrounding the bottom wall. The bottom wall is substantially parallel to a side direction of the baby carriage 200.

A post-shaped handrail pivot hole 221 is raised at a center of the bottom wall of the handrail box 225, and handrail positioning sectors are disposed between the pivot hole and the side wall of the handrail box 225. In this embodiment, each of the handrail positioning sectors is a block components raised from the bottom wall of the handrail box 225, which has a fan-shaped cross section in a direction parallel to the bottom wall, and straight side surfaces in a direction perpendicular to the bottom wall. The handrail positioning sectors are raised to a height exceeding the side wall, so as to be inserted into the shell box 215 opposite to the handrail box 225. In this embodiment, there are provided two handrail positioning sectors, i.e., a first handrail positioning sector 222 and a second handrail positioning sector 223. The first handrail positioning sector 222 and the second handrail positioning sector 223 are arranged at a circumferential interval of 180 degrees in the handrail box 225. In other embodiments, the handrail positioning sectors may have different shapes, for example, a flat plate shape perpendicular to the bottom wall. In other embodiments, the handrail positioning sectors may have a different number, for example, one or more than two.

Figure 10:
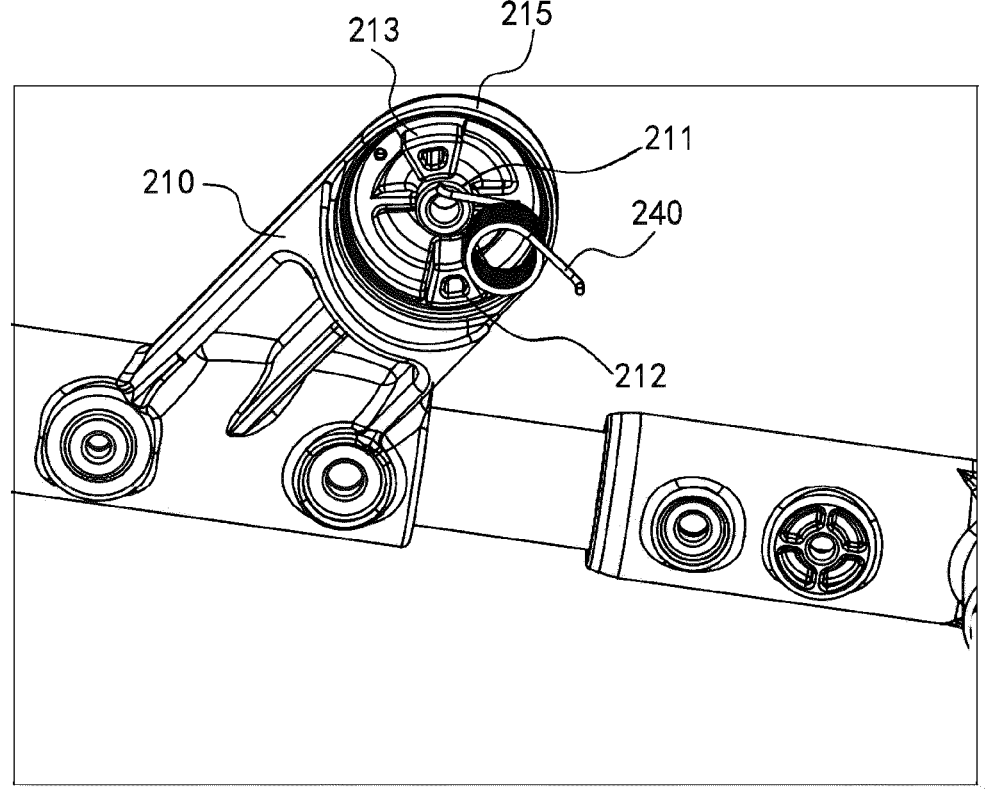
FIG. 10 is a partial enlarged view of the pivotal joint between the handrail and the shell of the baby carriage in FIG. 6 from another angle, in which the shell and the elastic member are shown in an exploded manner.

Referring to FIG. 10. FIG. 10 is a partial enlarged view of the pivotal joint between the handrail 230 and the shell 210 of the baby carriage 200 in FIG. 6 from another angle, in which the shell 210 and the elastic member 240 are shown in an exploded manner. As shown, the shell 210 is fixed to the seat frame and protrudes from the seat frame. The substantially cylindrical shell box 215 is disposed on the shell 210, and is opposite to the handrail box 225 and has a size as same as that of the handrail box 225. The shell box 215 also has a bottom wall and an annular side wall surrounding the bottom wall. In this way, the shell box 215 and the handrail box 225 are clasped to each other to form a complete cylindrical accommodating space.

A shell pivot hole 211 is disposed at a center of the shell box 215, and a pivot (not shown) passes through the handrail pivot hole 221 and the shell pivot hole 211 to from a pivotal connection between the shell 210 and the handrail connecting part 220.

The shell box 215 includes shell positioning sectors. The shape of the shell positioning sectors is as same as that of the handrail positioning sectors, and the number of the shell positioning sectors is corresponding to that of the handrail positioning sectors. The shell positioning sectors are raised from the bottom wall of the shell box 215 to exceed the side wall thereof, so as to be inserted into the handrail box 225.

The handrail positioning sectors and the shell positioning sectors are staggered apart to each other, and the side walls of the handrail positioning sectors and the shell positioning sectors may abut against each other to limit a relative rotation between the handrail connecting part 220 and the shell 210. In other words, when the handrail connecting part 220 (and the handrail 230) is in the bounced up position, the handrail positioning sectors and the shell positioning sectors abut against each other, so as to prevent the handrail connecting part 220 from rotating beyond the bounced up position (see FIG. 8).

In this embodiment, the elastic member 240 is a torsion spring wound on an outer circumference of the pivot, the torsion spring has one end abutting against the shell box 215 and the other end abutting against the handrail box 225, and is loaded to bias the handrail connecting part 220 toward the bounced up position.

It is easy to understand, by the handrail mechanism in this embodiment, the function that the handrail 230 can be pressed down and can be automatically reset are realized.

Figure 11:
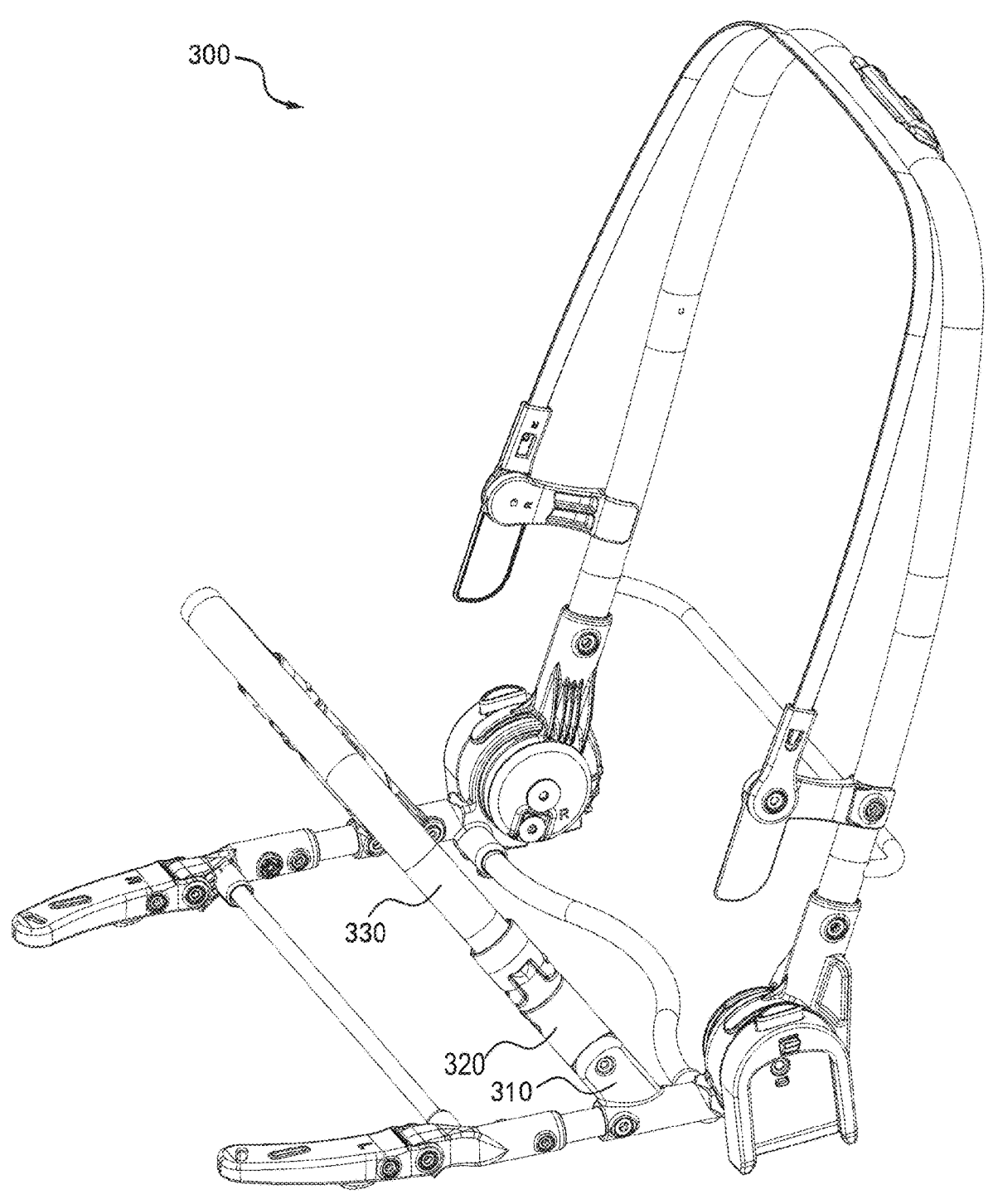
FIG. 11 is a perspective view of the baby carriage according to the second embodiment of the application, in which the handrail is in the bounced up position.
Figure 12:
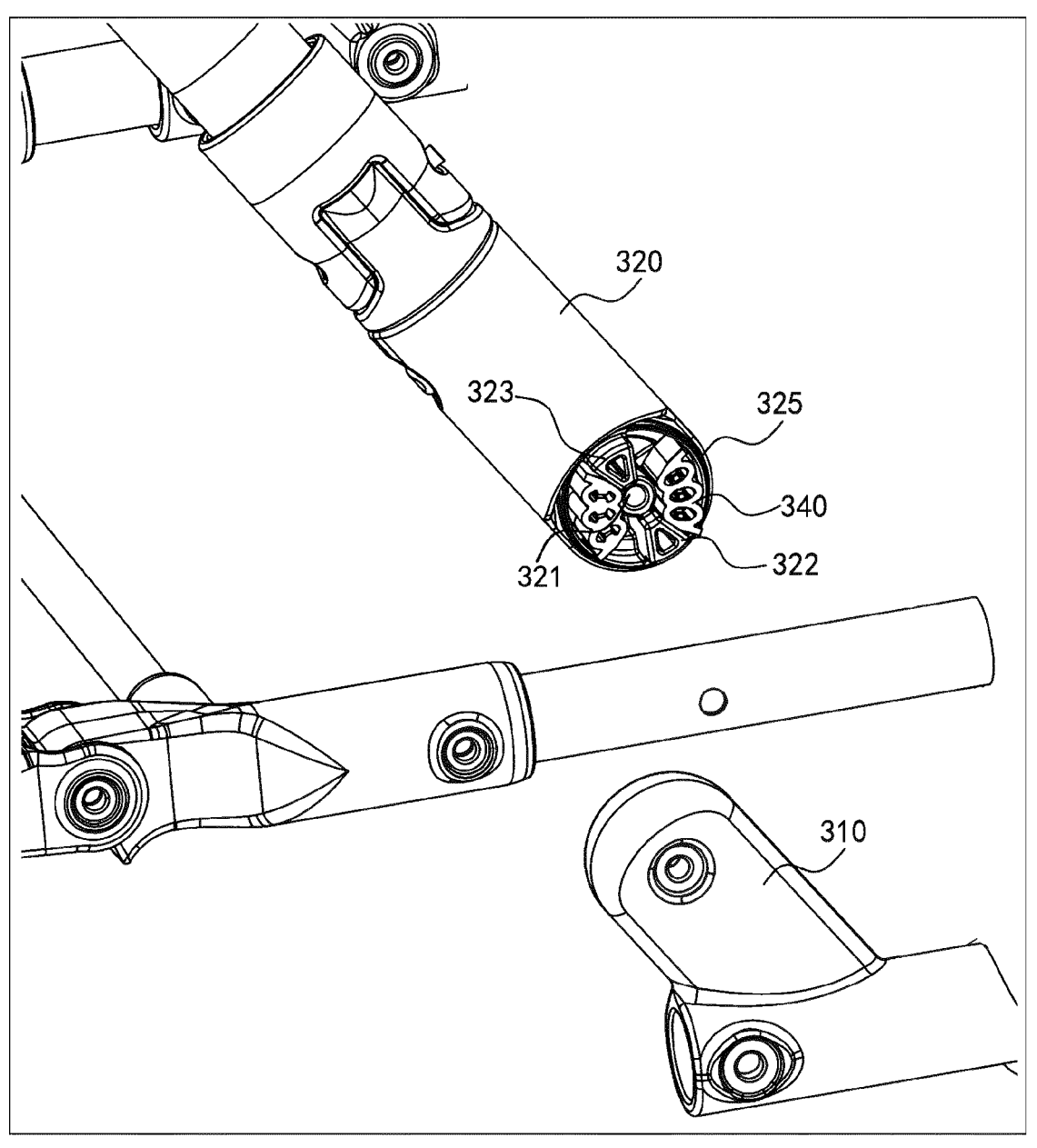
FIG. 12 is a partial enlarged view of the pivotal joint between the handrail and the seat frame of the baby carriage in FIG. 11, in which the shell and the handrail connecting part are shown in an exploded manner, and an elastic member mounted in the handrail connecting part is also shown.
Figure 13:
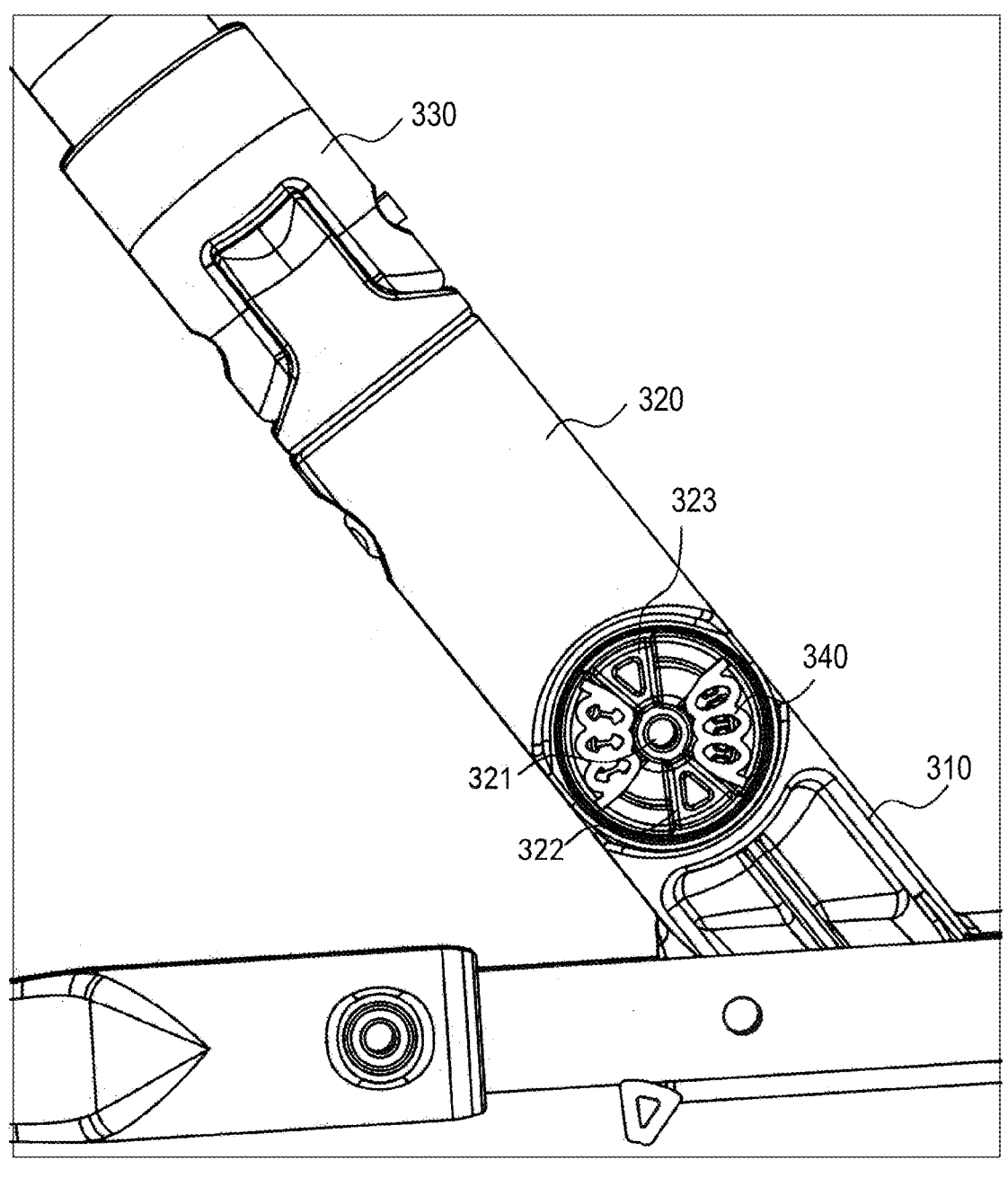
FIG. 13 is a partial enlarged section view of the pivotal joint between the handrail and the seat frame of the baby carriage in FIG. 11.
Figure 14:
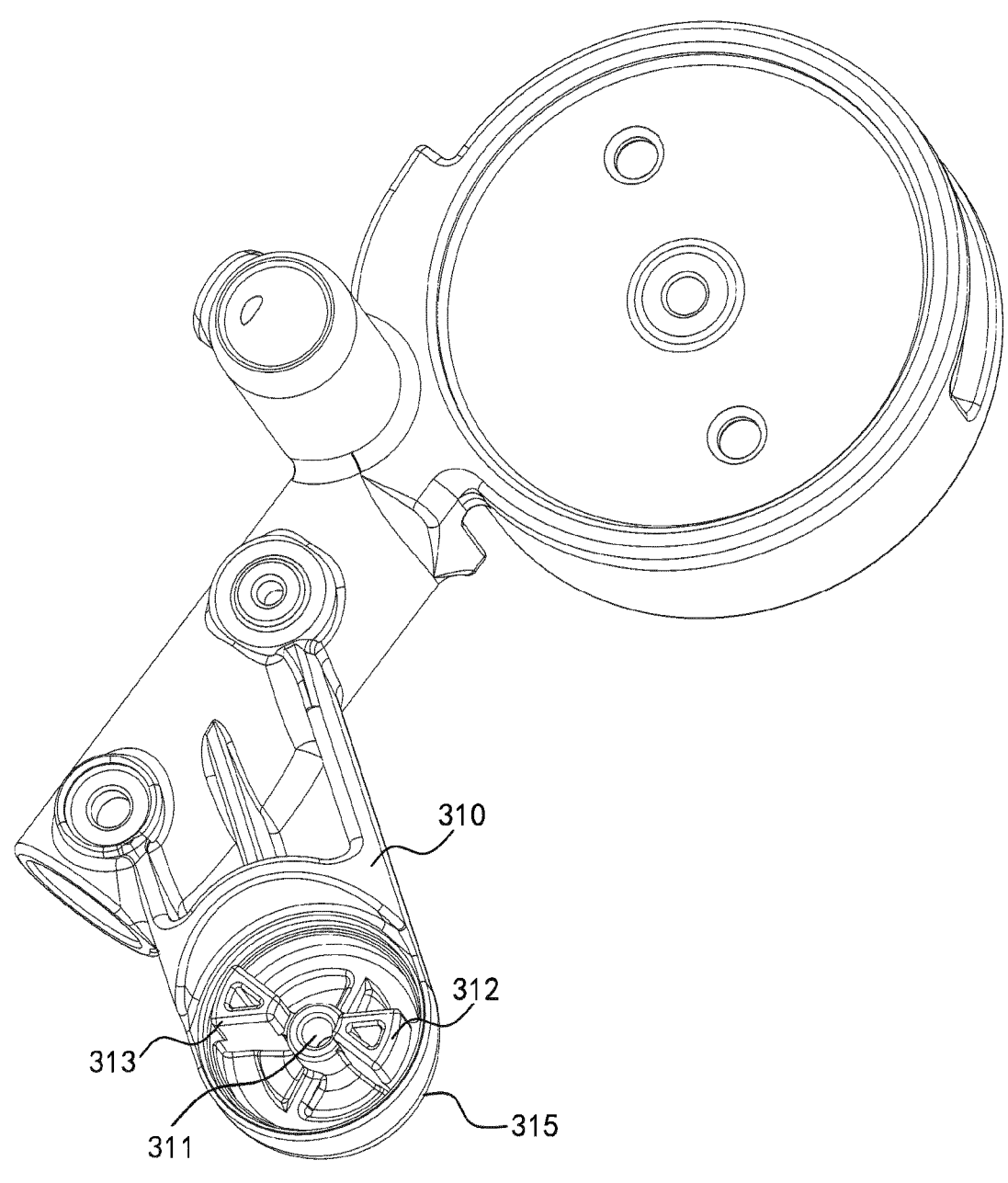
FIG. 14 is a perspective view of the shell of the baby carriage in FIG. 11.

The third embodiment of the application will be described by referring to FIGS. 11-14. FIG. 11 is a perspective view of the baby carriage 300 according to the second embodiment of the application, in which the handrail 330 is in the bounced up position; FIG. 12 is a partial enlarged view of the pivotal joint between the handrail 330 and the shell 310 of the baby carriage 300 in FIG. 11, in which the shell 310 and the handrail connecting part 320 are shown in an exploded manner, and the elastic member 340 mounted in the handrail connecting part 320t is also shown;

FIG. 13 is a partial enlarged section view of the pivotal joint between the handrail 330 and the shell 310 of the baby carriage 300 in FIG. 11; and FIG. 14 is a perspective view of the shell 310 of the baby carriage 300 in FIG. 11. Most parts of the third embodiment and the second embodiment are the same, and the differences between the two embodiments are described below.

In the third embodiment, the elastic member 340 is not a torsion spring, but a block or honeycomb elastic material. The elastic member 340 surrounds the pivot and is filled in the shell box 315 and the handrail box 325, and has both sides respectively abutting against the side walls of the shell positioning sectors and the handrail positioning sectors. When the handrail connecting part 320 (and the handrail 330) moves toward the pressed down position, the elastic member 340 is compressed to provide a biasing force, so as to provide the handrail 330 with an automatic reset function.

To sum up, according to the present application, the handrail can be displaced under pressure and automatically reset after the pressure is removed.

Although the present application has been described with reference to the typical embodiments, the terms used are illustrative and exemplary rather than restrictive. Since this application can be implemented in various forms without departing from the spirit and essence of the application, it should be understood, the above-mentioned embodiments are not limited to any of the foregoing details, but should be interpreted in the broadest sense within the scope defined by the claims. Therefore, all changes falling within the scope of the claims or their equivalents shall be covered by the claims.

LIST OF REFERENCE NUMBERS

100, 200, 300: BABY CARRIAGE
   110, 210, 310: SHELL
      110A: OUTER SHELL
      110B: INNER SHELL
      111, 211, 311: SHELL PIVOT HOLE
      113: ELASTIC MEMBER FIXING PART
      212, 312: FIRST SHELL POSITIONING SECTOR
      213, 313: SECOND SHELL POSITIONING SECTOR
   115: HANDRAIL MOUNTING PART
   215, 315: SHELL BOX
   120, 220, 320: HANDRAIL CONNECTING PART
      121: HANDRAIL PIVOT
      122: ELASTIC MEMBER HOLE
      221, 321: HANDRAIL PIVOT HOLE
      222, 322: FIRST HANDRAIL POSITIONING SECTOR
      223, 323: SECOND HANDRAIL POSITIONING SECTOR
      225, 325: HANDRAIL BOX
   130, 230, 330: HANDRAIL
   140, 240, 340: ELASTIC MEMBER

What is claimed is:

1. A handrail mechanism comprising:
a shell having an accommodating space and a shell positioning sector;
a handrail connecting part having a free end, a pivotal end, and a handrail positioning sector, the pivotal end pivotally connected to the shell; and
an elastic member arranged in the accommodating space of the shell, the elastic member having one end connected to the shell and the other end connected to the handrail connecting part,
wherein the handrail connecting part is pivoted between a bounced up position and a pressed down position, the free end of the handrail connecting part is away from the shell in the bounced up position and is close to the shell in the pressed down position, the elastic member is arranged to bias the handrail connecting part toward the bounced up position, and when an external force is applied to overcome an action of the elastic member, the handrail connecting part is pivotable from the bounced up position to the pressed down position, and when the handrail connecting part is in its bounced up position, one side of the shell positioning sector abuts against the handrail positioning sector, thereby allowing the handrail connecting part to rotate toward the pressed down position; and when the handrail connecting part is in its pressed down position, the other side of the shell positioning sector abuts against the handrail positioning sector, thereby allowing the handrail connecting part to rotate toward the bounced up position.

2. The handrail mechanism according to claim 1, wherein:
the pivotal end of the handrail connecting part is in a shape of a flat plate, and a handrail pivot hole is arranged on the pivotal end;

a handrail mounting part is disposed in the shell, the handrail mounting part includes two opposed plate-shaped arms protruding from one side of the shell facing the handrail connecting part, and the pivotal end is inserted between the two opposed plate-shaped arms of the handrail mounting part; and
the two opposed plate-shaped arms have shell pivot holes corresponding to the handrail pivot hole, and a handrail pivot is installed in the handrail pivot hole of the handrail mounting part and the shell pivot holes of the handrail mounting part.

3. The handrail mechanism according to claim 2, wherein:
the elastic member is a tension spring; and
the pivotal end has an elastic member hole, and the other end of the elastic member is connected to the elastic member hole for applying a tensile force to bias the handrail connecting part toward the bounced up position.

4. The handrail mechanism according to claim 1, wherein:
the pivotal end of the handrail connecting part is a substantially cylindrical handrail box, and the handrail box has a bottom wall, an annular inner side wall surrounding the bottom wall, and a handrail pivot hole arranged on the bottom wall;
the shell has a substantially cylindrical shell box corresponding to the handrail box, and the shell box has a bottom wall, an annular inner side wall surrounding the bottom wall, and a shell pivot hole at the bottom wall corresponding to the handrail pivot hole; and
a handrail pivot installed in the handrail pivot hole and the shell pivot hole, such that the handrail box and the shell box are able to be clasped together to form a closed space.

5. A handrail mechanism according to claim 4, wherein:
the shell positioning sector is formed by protruding from the bottom wall of the shell box toward the handrail box in a vicinity of the annular inner side wall of the shell box;
the handrail positioning sector is formed by protruding from the bottom wall of the handrail box toward the shell box in a vicinity of the annular inner side wall of the handrail box.

6. The handrail mechanism according to claim 5, wherein:
the shell positioning sector and the handrail positioning sector are both fan-shaped in respect to their annular inner side walls, and have side walls extending radially with the handrail pivot as a center, and when the shell positioning sector abuts against the handrail positioning sector, the side wall of the shell positioning sector contacts the side wall of the handrail positioning sector.

7. The handrail mechanism according to claim 5, wherein:
the shell positioning sector and the handrail positioning sector are respectively arranged in two or more evenly distributed in a circumferential direction with the handrail pivot as a center.

8. The handrail mechanism according to claim 5, wherein:
the elastic member is a torsion spring wound on an outer circumference of the handrail pivot, the elastic member has one end abutting against the shell box, and the other end abutting against the handrail box.

9. The handrail mechanism according to claim 5, wherein:
the elastic member is an elastic material surrounding the handrail pivot filled in the shell box and the handrail box, both ends of the elastic member respectively abut against the shell positioning sector and the handrail positioning sector, and when the handrail connecting part moves toward the pressed down position, the elastic member is compressed to provide a biasing force.

10. The handrail mechanism of claim 1, wherein:

the shell includes an outer shell and an inner shell, the outer shell is clasped on the inner shell to form the accommodating space of the shell, and the handrail connecting part is disposed on the outer shell.

11. The handrail mechanism of claim 10, wherein:

the outer shell and the inner shell are strip-shaped components extending along a front and rear direction of a baby carriage; and one of the outer shell and the inner shell is provided with a bottom wall and a side wall, and the other is provided with a side wall.

12. The handrail mechanism of claim 3, wherein, one end of the elastic member is fixedly connected to an elastic member fixing part inside the shell;

the elastic member hole is located at the pivot end of the handrail connecting part, and is located closer to the elastic member fixing part than the handrail pivot; and when viewed from a horizontal direction of a baby carriage, the elastic member hole is located between the elastic member fixing part and the handrail pivot, and when viewed from a vertical direction of the baby carriage, the elastic member hole is further away from the free end of the handrail connecting part than the handrail pivot.

13. The handrail mechanism of claim 5, wherein, the handrail positioning sector is a block component raised from the bottom wall of the handrail box; and the handrail positioning sector has a fan-shaped cross section in a direction parallel to the bottom wall and straight side surfaces in a direction perpendicular to the bottom wall.

14. The handrail mechanism of claim 13, wherein:

the handrail positioning sector is raised to a height exceeding the side wall of the handrail box for insertion into the shell box.

15. The handrail mechanism of claim 5, wherein, two handrail positioning sectors are provided, including a first handrail positioning sector and a second handrail positioning sector which are arranged at a circumferential interval of 180 degrees in the handrail box; and two shell positioning sectors are provided, including a first shell positioning sector and a second shell positioning sector which are arranged at a circumferential interval of 180 degrees in the shell box.

16. The handrail mechanism of claim 15, wherein:

the handrail positioning sectors and the shell positioning sectors are staggered with each other, and the side walls of the handrail positioning sectors and the shell positioning sectors abut against each other to limit a relative rotation between the handrail connecting part and the shell.

17. The handrail mechanism of claim 5, wherein:

each the handrail positioning sector and the shell positioning sector is provided with a flat plate shape perpendicular to the bottom wall.

18. A baby carriage comprising:

a carriage frame;

wheels, located under the carriage frame to provide a travelling direction;

a seat frame, disposed on the carriage frame and including:

two side frames, respectively located on both sides of the carriage frame, and extending along the travelling direction of the baby carriage;

a handrail, set up on the two side frames, the handrail including a horizontal section extending between the two side frames and two vertical sections respectively connected to the two side frames from both ends of the horizontal section; and two handrail mechanisms according to claim 1, respectively installed at connections between the two vertical sections of the handrail and the two side frames, wherein the handrail connecting part is fixed to the vertical sections of the handrail, and the shell is fixed to the side frames.

19. The baby carriage of claim 18, wherein the vertical section obliquely extends downward and backward to be connected to the carriage frame.

* * * * *